United States Patent Office 3,467,729
Patented Sept. 16, 1969

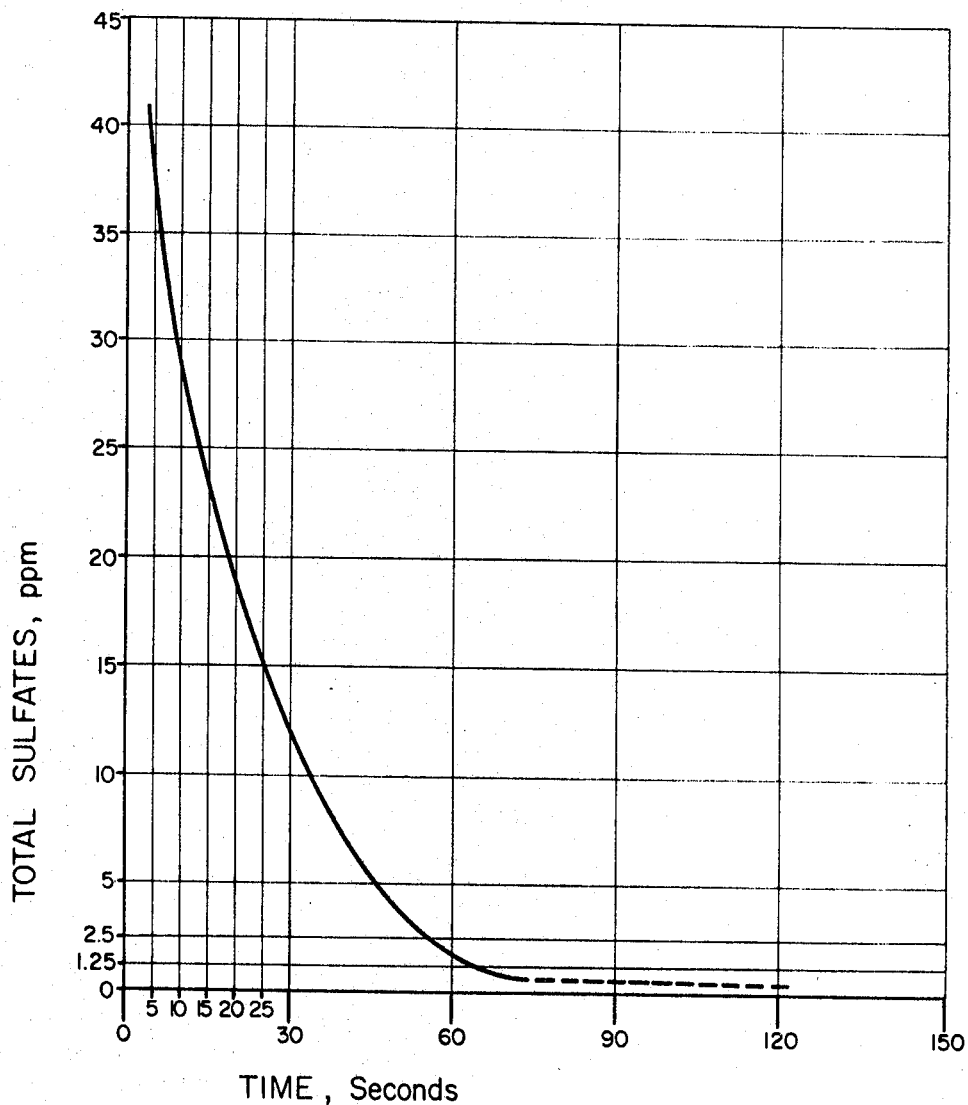

3,467,729
ALKYLATION PROCESS
Robert T. Rodgers, Newark, Del., assignor to Tidewater Oil Company, Los Angeles, Calif., a corporation of Delaware
Filed Sept. 7, 1966, Ser. No. 577,722
Int. Cl. C07c 3/54
U.S. Cl. 260—683.62           3 Claims

ABSTRACT OF THE DISCLOSURE

An improved alkylation process is described, whereby alkylate effluent containing neutral esters is intimately mixed with concentrated sulfuric acid and the intimate mixture allowed to stand for at least about one minute, thereby purifying the alkylate effluent of the neutral esters.

---

Figure 1:
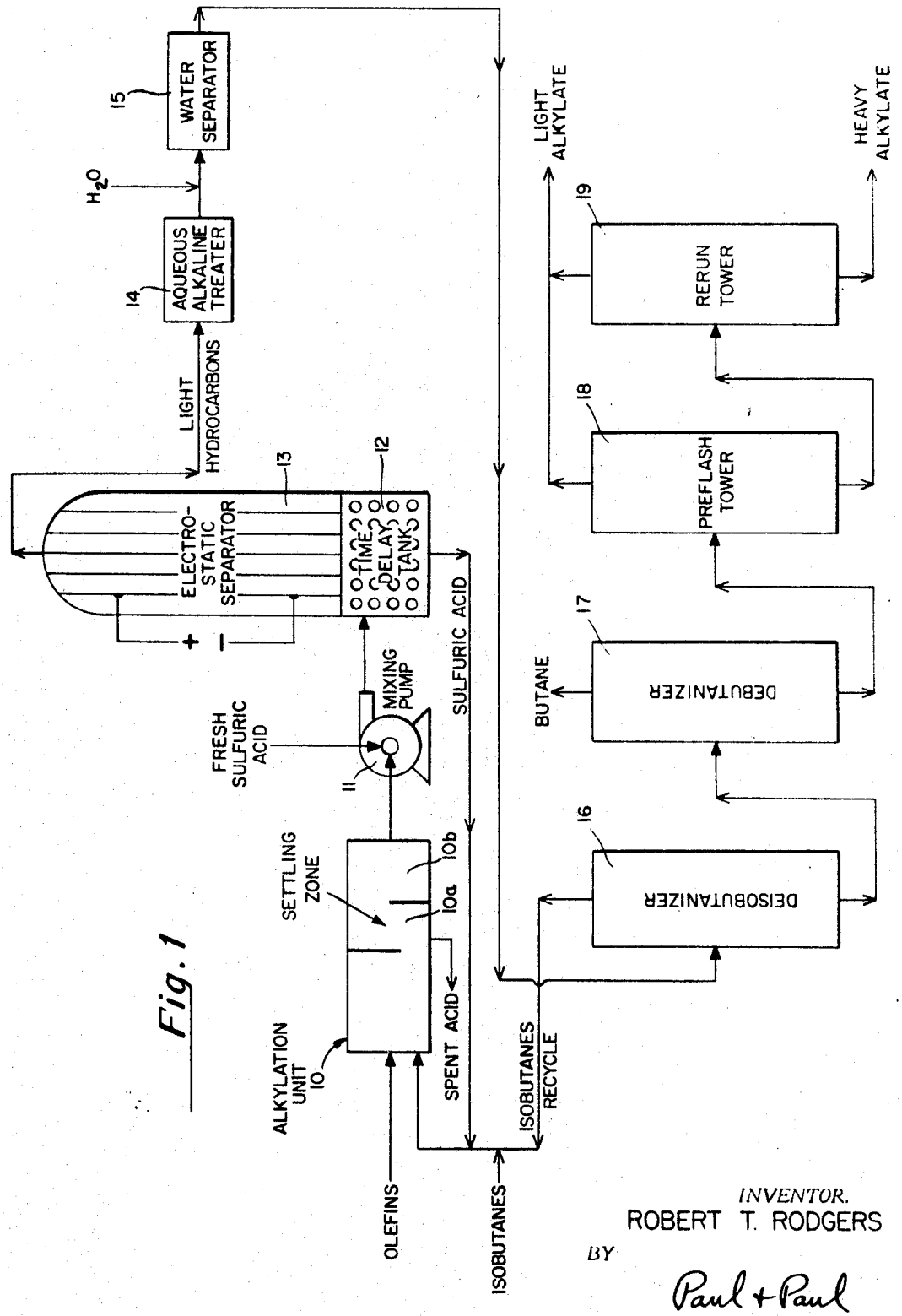

This invention relates to a process for producing improved alkylate stock by preventing the corrosion and fouling of metallic equipment used in processing hydrocarbons. More particularly, this invention concerns a process for removing alkyl sulfates and other corrosion-forming precursors from the hydrocarbon effluent of a sulfuric acid-catalyzed alkylation reaction zone.

When fractionating alkyl sulfate-containing hydrocarbon effluent from a reactor in which an alkylation reaction between an isoparaffin and an olefin has been carried out in the presence of sulfuric acid catalyst, corrosion and fouling of the processing equipment is frequently encountered. Various attempts to deal with the problem, as by using stainless steel or other corrosion resistant equipment, lining the equipment with a plastic or other non-reaction material, and removing the corrosive components prior to processing the hydrocarbons have been found either ineffective or too costly to practice. The presence of alkyl sulfates is also known to reduce the quality of the alkylate products of such process.

The present invention provides an efficient, economical and quick method of overcoming these quality and corrosion problems. When the process of this invention is employed to clean up the hydrocarbon effluent from a sulfuric acid-catalyzed alkylation reaction, the total sulfate content of the effluent is reduced to less than one part per million and the more valuable light alkylate is increased at the expense of the lesser desirable heavy alkylate, while upgrading the heavy alkylate to the extent it can be used as a gasoline blending stock or solvent.

Broadly considered, the present invention comprises rapidly and thoroughly admixing concentrated sulfuric acid with the hydrocarbons containing neutral esters, maintaining the components of the resulting mixture in intimate contact for a limited time, and then separating the mixture into an acid phase and a hydrocarbon phase.

The degree of rapidity and thoroughness to which the acid and the hydrocarbons are mixed is critical to the satisfactory performance of the process. Although the process will reduce the corrosiveness of the hydrocarbons somewhat if it is performed under other conditions, the substantially complete removal of the neutral esters in the unexpectedly short time that the acid and hydrocarbons must be held in contact, and at the extremely low treat rate (ratio of acid to hydrocarbons) employed, is possible only if the acid and hydrocarbons are mixed very quickly and very thoroughly according to the invention.

As long as the acid and the hydrocarbons are mixed rapidly and thoroughly, the mixing can be done by any of a number of methods. One way that has been found very satisfactory is by injecting the acid into a moving stream of the hydrocarbons in front of a centrifugal pump. Other types of injector pumps can be used provided they mix the acid and the hydrocarbons at the required speed and to the degree of thoroughness demanded by the process. Mixing devices or procedures of other types, as shakers, stirrers, or similar agitators which are used to mix the components as they are being combined, are operable if they perform this critical step in the required manner.

The treat rate (ratio of acid to hydrocarbons) that can be used in carrying out the process of this invention may vary from as high as 0.1 volume of acid per volume of hydrocarbons, down to 0.01 or below. Extremely satisfactory results have been obtained on sulfuric acid-catalyzed alkylation hydrocarbon effluent with treat rates of between 0.02 and 0.05. The treat rate employed will vary depending upon the type of hydrocarbons undergoing purification, but in all cases will be considerably less than that heretofore required in other extracting processes.

The time required by this process to substantially eliminate the corrosion-precursors from the hydrocarbons will vary depending upon the nature of the hydrocarbons being treated and the speed and thoroughness at which the components are mixed. Generally speaking, contact times of at least about 1 minute have been found quite satisfactory for sulfuric acid-catalyzed alkylation process effluent.

The process can be carried out at temperatures within the range of about 30 to about 150° F. When treating sulfuric acid-catalyzed alkylation effluent, the process is performed at the temperature of the effluent coming from the alkylation reactor, which usually is well within this range. No pressure, other than that sufficient to maintain the reactants in liquid phase, is required in this process.

At the end of the desired contact time, the acid and the hydrocarbons can be separated in a variety of ways, including electrostatic precipitation, centrifugal action, and just plain gravity settling. Separating the acid from the liquid hydrocarbons (electrostatically) has been very effective when the hydrocarbons comprise alkylation process effluent, for this method provides substantially 100% complete separation in a very brief time and the apparatus is relatively inexpensive.

When treating sulfuric acid-catalyzed alkylation hydrocarbon effluent, the separated acid can be sent directly to the alkylation reactor or can be mixed with other makeup acids and injected with it. The acid following its use in the process of this invention is not diluted to any material extent and remains essentially the same.

In the drawings, FIG. 1 is a schematic flow diagram of the process of this invention employed in a sulfuric acid-catalyzed alkylation process. FIG. 2 is a graph showing the rate of reduction of total sulfates in such hydrocarbon effluent per unit of contact time in seconds.

Referring now to FIG. 1, into an alkylation unit 10, having a settling zone 10a, and an alkylate effluent zone 10b are fed olefins, isobutanes and sulfuric acid catalyst. Upon completion of the alkylation reaction and settling of the catalyst product, the effluent alkylate stream is introduced into a centrifugal mixing pump 11 together with the necessary amount of 98% sulfuric acid in accordance with the ranges of this invention. The pump 11 intimately mixes the alkylate effluent containing neutral esters with the sulfuric acid, and this mixture is passed to a time delay tank 12, which is constructed with baffles or otherwise to provide a means for permitting the intimate mixture of effluent and acid to be maintained for at least about one minute. At the end of the delay period, the mixture is passed into an electrostatic separator 13 which separates a purified alkylate effluent from sulfuric acid-catalyst containing neutral esters which is returned to the alkylation unit. The separated alkylate effluent is then neutralized in conventional ways in an aqueous alkaline treater 14 and water washed. The purified alkylate is then processed through a deisobutanizer 16, a debutanizer 17, a preflash tower 18, and a rerun tower 19, giving a final top product of light alkylate and a final bottom product of heavy alkylate. Isobutanes from the deisobutanizer 16 are recycled to the alkylation unit 10.

To illustrate the invention in more detail, the following are examples of performing the process of this invention on alkylation hydrocarbon effluent as compared with unsuccessful methods. It is understood that these examples are descriptive only, and that the invention is not limited thereby.

EXAMPLE 1

Liquid hydrocarbons containing 207 p.p.m. sulfur as total sulfates, coming as effluent from a sulfuric acid alkylation process reactor, and having been separated by gravity from the sulfuric acid catalyst were mixed with 98% sulfuric acid in varying acid to alkylate volume ratios including 0.015, 0.030, 0.045, 0.060 and 0.100. The streams were mixed using a mixing valve with a 5 p.s.i.g. drop across the valve. After immediate separation of the acid phase, debutanization of the hydrocarbon, and alkaline water washing (11.5 pH) of the alkylate gasoline, the total sulfate content of the gasoline was found to be in the range of from 49 to 92 p.p.m. sulfur as total sulfates, which values are not considered to be acceptable.

EXAMPLE 2

Liquid hydrocarbons containing 260 p.p.m. sulfur as total sulfates, coming as effluent from a sulfuric acid alkylation process reactor, and having been separated by gravity from the sulfuric acid catalyst were mixed with 98% sulfuric acid in an acid to alkylate volume ratio of 0.030. The streams were mixed, using a reactor effluent centrifugal pump. After immediate separation of the acid phase, debutanization of the hydrocarbon and alkaline water washing (11.5 pH) of the alkylate gasoline, the total sulfur content of the gasoline was found to be in the range of from 48 to 58 p.p.m. sulfur as total sulfates, which values are not considered to be acceptable.

EXAMPLE 3

Liquid hydrocarbons containing 184 p.p.m. sulfur as total sulfates, coming as effluent from a sulfuric acid alkylation process reactor, and having been separated by gravity from the sulfuric acid catalyst, and 98% sulfuric acid were rapidly and thoroughly mixed at a volume ratio of 0.03 (acid to hydrocarbons) by injecting the acid into the hydrocarbons through a conventional reactor effluent centrifugal pump. The mixture was held in a contacting drum for 1.1 minutes, and then electrostatically separated into an acid stream and a hydrocarbon stream. Following debutanization and washing with water of pH 11.5, the total sulfur content of the hydrocarbon stream was found to be less than 1 p.p.m.

EXAMPLE 4

A portion of the same alkylation effluent stream of Example 3, containing 184 p.p.m. sulfur as total sulfates, was treated with 98% sulfuric acid at a volume ratio of 0.03 (acid to hydrocarbons), and the mixture then held in a contact drum for 20 minutes. Analysis of the separated debutanized and alkaline water washed hydrocarbon stream indicated that it contained less than 1 p.p.m. sulfur.

EXAMPLE 5

Alkylation hydrocarbon effluent, containing 212 p.p.m. sulfur as total sulfates, was rapidly and thoroughly mixed with 98% sulfuric acid in an acid to hydrocarbons volume ratio of 0.02, and the mixture held for 7 minutes before separation into an acid phase and a liquid hydrocarbon phase. The liquid hydrocarbon phase was washed with alkaline water of pH 11.5 and then debutanized. Analysis of the liquid hydrocarbon phase showed that it contained less than 1 p.p.m. sulfur.

EXAMPLE 6

A portion of the same alkylation plant effluent of Example 5 was rapidly and thoroughly mixed with 98% sulfuric acid in an acid to hydrocarbons volume ratio of 0.01. The mixture was allowed to stand for 7 minutes, separated, and the liquid hydrocarbon phase washed with alkaline water of pH 11.5 and debutanized. The resulting hydrocarbons contained less than 1 p.p.m. total sulfur.

EXAMPLE 7

Alkylation plant effluent containing 1,250 p.p.m. sulfur was rapidly and thoroughly mixed with 98% sulfuric acid in an acid to hydrocarbons volume ratio of 0.03, using a conventional reactor effluent centrifugal pump. The mixture was held for 6.8 minutes and then separated into an acid phase and a liquid hydrocarbon phase. The liquid hydrocarbon phase was washed with alkaline water of pH 11.5, debutanized and then analyzed. It was found to contain less than 1 p.p.m. sulfur.

This liquid hydrocarbon phase was then distilled into light alkylate (an aviation gasoline component) and heavy alkylate without any observable corrosion of the distillation apparatus. The total sulfur content of the heavy alkylate was reduced from 350 to 7 p.p.m. sulfur because of the practice of this invention, thereby increasing the value of the heavy alkylate as a gasoline blending component and a specialty product.

By comparing the results of Examples 1 and 2 with those of Examples 3, 4, 5, 6 and 7, it will be clear that the improved process of this invention is dependent upon the delayed intimate contact of 98% sulfuric acid with the alkylate reactor effluent. The process of this invention therefore comprises the steps of (1) conducting an alkylation reaction between an isoparaffin stream and an olefin stream in the presence of a sulfuric acid catalyst, said reaction producing an alkylate effluent containing neutral sulfate esters as an impurity, (2) separating the alkylate effluent of step (1) from sulfuric acid catalyst, (3) intimately mixing the alkylate effluent containing neutral sulfate esters as an impurity of step (1) with concentrated sulfuric acid, (4) allowing the resultant mixture from step (3) to remain intact for at least about one minute, then, (5) separating alkylate purified of neutral esters from the resultant mixture from step (3), (6) neutralizing the purified alkylate from step (5) and (7) fractionating the neutralized alkylate from step (6) into a light alkylate and a heavy alkylate.

In FIG. 2, the critical relationship between contact time and sulfates removal will be seen.

In addition to the advantages discussed heretofore, the early removal of sulfates in accordance with the process of this invention permits a reduction in the ammonia, triethanolamine and caustic requirements normally needed for alkylate clean-up.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

Having thus described my invention, I claim:
1. An alkylation process comprising the steps of:
   (1) mixing an isoparaffin stream and an olefin stream with a sulfuric acid catalyst, thereby initiating an alkylation reaction, said reaction producing an alkylate effluent containing neutral sulfate esters as an impurity,

(2) allowing the alkylate effluent to separate by settling into a hydrocarbon phase and an acid phase, whereby said neutral sulfate esters are retained in said hydrocarbon phase,
(3) intimately mixing the hydrocarbon phase produced by step (2) with concentrated sulfuric acid,
(4) allowing the resultant mixture in step (3) to remain as an intimate mixture for at least about one minute to dissolve said neutral sulfate esters in said acid,
(5) separating hydrocarbon phase alkylate purified of neutral esters from the resultant mixture of step (3) after passage of the time period specified in step (4),
(6) neutralizing the purified alkylate from step (5),
(7) removing unreacted isoparaffins from the neutralized purified alkylate of step (6), and
(8) fractionating the product of step (7) into a light alkylate and a heavy alkalate.

2. The process of claim 1 wherein the sulfuric acid to alkylate effluent volume ratio is in the range of from about 0.01 to 0.10.

3. The process of claim 1 wherein the sulfuric acid separated in step (5) is returned for use as part of the sulfuric acid catalyst utilized in step (1).

References Cited

UNITED STATES PATENTS 3,234,301  2/1966  Goldsby _____ 260—683.62
3,227,774  1/1966  Goldsby _____ 260—683.62

DELBERT E. GANTZ, Primary Examiner

G. J. CRASANAKIS, Assistant Examiner